3,123,709
DENSITY MEASUREMENTS OF BOREHOLE
FLUIDS USING AXIALLY SPACED RADIO-
ACTIVE SOURCE AND DETECTOR MEANS
Richard L. Caldwell and Robert F. Sippel, Dallas, Tex.,
assignors to Socony Mobil Oil Company, Inc., a corporation of New York
Filed Mar. 10, 1960, Ser. No. 15,026
7 Claims. (Cl. 250—43.5)

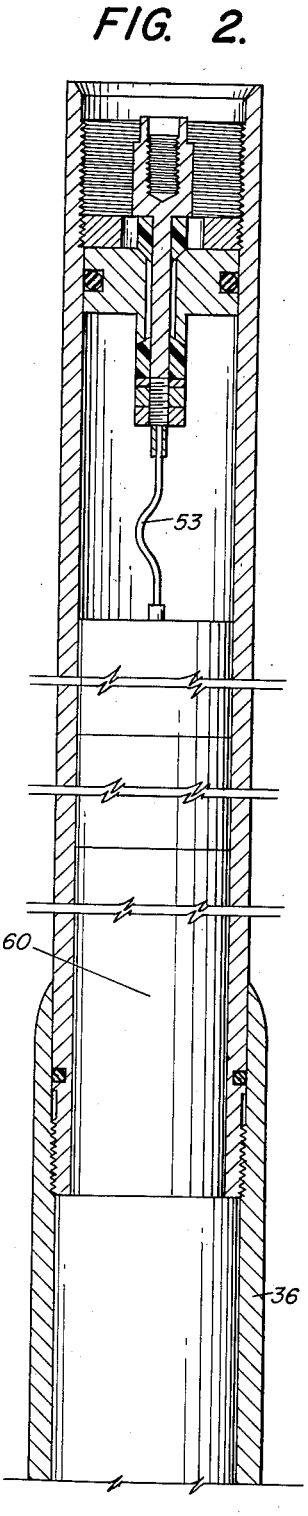

This invention relates to the measurement of density of borehole fluids at various points along the length of a well bore and more particularly to measurement of the gamma radiation transmission properties of the borehole fluids wherein the effects of adjacent formations are minimized.

This application is a continuation-in-part of application Serial No. 606,289, filed August 27, 1956, now abandoned.

It is known that gamma-rays in passing through a subsance are scattered or are absorbed in dependence upon the density of the media forming the transmission path. Gamma radiation from a given source transmitted through the medium may also provide a measure of the density of the medium. In well logging procedures measurements are made dependent upon the scattering and the absorption or dissipation of radiation, including gamma radiation, as an indication of the density of the formations and fluids therein.

In accordance with the present invention, low energy gamma-rays are employed for transmission along a path occupied by fluids within the borehole and the gamma-rays traversing such path are measured. In a more specific aspect there is provided a flow channel adapted to be supported for movement through a conduit carrying such fluids. A source of gamma radiation is provided within the flow channel such that radiation is highly attenuated in all directions except along a path parallel to the axis of the flow channel. An energy sensitive gamma-ray detector is supported at a point along a flow path spaced from the source for detecting gamma radiation which passes through the medium intermediate the source and detector. Thus a measurement of the response of the detector provides an indication of the density of the medium through which the gamma-rays have passed. Further, in order to avoid the influence of variations in position of the system in a given conduit as well as variations in the diameter of the conduit, high density material is provided as to define the walls of the flow channel thereby to prevent the scattering of gamma radiation by the formations or other material outside the flow path while maintaining the flow path substantially unobstructed.

For a more complete understanding of the present invention and for further advantages thereof, reference may now be had to the following description taken in conjunction with the accompanying drawings in which:

FIG. 1 is a sectional view showing a logging instrument in a borehole;

FIGS. 2 and 3 comprise sections of a borehole instrument;

FIG. 4 is a sectional view taken along the line 4—4 of FIG. 3; and

FIG. 5 is a sectional view taken along the line 5—5 of FIG. 3.

In FIG. 1 there is illustrated a logging tool 10 positioned in borehole 11, provided with a lower section 12 which forms a flow channel for fluids entering the borehole. It is desired to be able to determine the points of ingress of fluids into the borehole and also to determine whether or not the fluids comprise oil, gas or water or a mixture of these components. As illustrated, fluids from a sand section 13 flow upwardly through a flow channel in the lower section 12 and then out through the upper end thereof. The unit 10 is supported by a cable 14 for movement along the borehole so that measurements may be made continuously along the length of the borehole as to the character of the fluids therein, thereby to provide more accurate data as to the fluid produced from the formations penetrated by the borehole.

The present invention relates to measurements of fluid density by use of relatively low energy gamma radiation. It has long been known that gamma radiation may be employed in boreholes to provide an indication as to the nature of the formations and, to a degree, the character of the fluids therein. In accordance with the present invention it is desired to provide measurements which are independent of the character of the environment outside the borehole and which are dependent only upon the properties of the fluid media inside the borehole. The device illustrated in FIGS. 2 and 3 makes possible such measurements. The present invention also makes possible these measurements in any diameter borehole without the necessity for corrections due to borehole size.

As shown in FIG. 3 the borehole unit 10 is provided with the lower section 12 which comprises essentially a hollow tube 20. The lower end 21 of tube 20 is open to provide an inlet port to the section 12. At a point spaced a short distance from the lower end a support means is provided for a gamma-ray source 22. The support means comprises a cup 23 which is internally threaded so as to receive source 22 and locking nut 24. A long stem 25 is provided for the cup 23 which is mounted in a tube 26. Tube 26 is supported by a web formed by three radial arms or extensions 27, 28 and 29, FIG. 5, two of which, the extensions 27 and 28, are shown in FIG. 3. The extensions 27–29 are secured to a ring 30 which is inserted into the lower end 21 of the casing 20. A set screw 31 is provided to maintain the ring 30 in position. Supported above ring 30 is a liner 33 providing a radiation barrier. The liner 33 is preferably of lead or tungsten which provides a high density cylindrical wall for the section 12 in the zone between source 22 and a detector 50 which will be mounted in a chamber 34.

The detector chamber 34 is formed inside a fitting 35 which threadedly engages a tubular housing 36, the latter being provided for an instrument section of the unit 10. The chamber 34 is of substantially smaller diameter than that of the tubular member 36 and is provided with a heavy metal liner 34b which has a central opening 34c in the end thereof facing source 22. The lower end 34a of fitting 35 supports the flow section 12 by means of integral arms 37, 38 and 39, FIG. 4, two of which, the arms 37 and 38, are shown in FIG. 3. Fluids may thus pass upward through section 12 and out into the borehole as along a flow path represented by arrows 40. The housing 36 extends upwardly as shown in FIG. 2 to provide a suitable chamber for detecting instrumentation.

A detector 50, preferably a scintillation crystal cylindrical in shape, is mounted in the chamber 34 and acts in conjunction with a photomultiplier tube 51 to provide a voltage for amplification in the detector amplifier section 60 of the system shown in FIG. 2. Thus there is transmitted by way of a signal circuit, including conductor 53, a signal which may be recorded at the earth's surface in relation to the depth of the unit 10 in the borehole. Such signal may then be relied upon as a measure of the density of the fluids inside the flow section 12 between source 22 and detector 50. By providing the supporting pedestal or cup 23, liner 33 and liner 34b, of high density materials, it is possible to eliminate the effect of the proximity of the borehole walls so that the borehole may be of varying diameter and unit 10 may be moved along the borehole and may be permitted to assume various orientations within the borehole without modifying, by reason of such variations, the transmission of gamma radiation to the detecting crystal 50. Transmission will thus be controlled solely by fluids intermediate source 22 and detector 50.

Thus there is provided a system for measuring the density of borehole fluids and includes the elongated flow channel which is supported for movement along a well bore or other conduit with a source of gamma radiation mounted in said flow channel wherein the mounting and the liner are provided highly to attenuate gamma radiation in all directions except along a path parallel to the axis of the flow channel. Means including the energy sensitive gamma-ray detector 50 supported in the path of gamma radiation at a point spaced from the source 22 as to detect the gamma radiation transmitted through the medium in the flow channel produce a signal which is related to and controlled by the density of the fluids. As is well understood by those skilled in the art, the counting rate produced in the photomultiplier tube 51 in response to scintillations in the crystal detector 50 has a magnitude proportional to the density of the gamma radiation impinging crystal detector 50. In the amplifier section 60 means are provided for selecting pulses according to size so as to count only pulses due to gamma-rays impinging on the crystal detector, thereby eliminating noise pulses originating in the photomultiplier tube 51 and other electronic circuit components. Surface instrumentation including the measuring unit 61 at the earth's surface will be provided to measure the counting rate corresponding to the intensity of radiation incident on the detector 50 and to measure thereby the density of the fluid in the flow channel.

Cable 14 is threaded over pulley 62. A coupling 63 transmits rotational motion or other signal representative of depth of unit 10 to measuring unit 61 as to provide an indication of the depth of unit 10 in the borehole whereby measurements may be made of the radiation from the detector system is dependence upon and accurately related to depth of the tool in the borehole.

In one embodiment of the invention, the instrument 10 was about 5½′ in length with the spacing between the source 22 and the scintillation crystal 50 about 10″. The housing 20 for flow channel 12 was 1³⁵⁄₆₄″ inside diameter. The lining 33 had a thickness of ³⁄₃₂″. The walls of the cup 23, made of tungsten alloy were about ⅛″ in thickness. The source 22 was, in one case, 10 millicuries of mercury 203 which has a half-life of about 45 days and gamma-ray energy of 279 k.e.v. In another case 100 millicuries of thulium 170 having a half-life of 127 days and gamma-ray energies and X-ray energies of 84 k.e.v. and 55 k.e.v., respectively, were used.

Results from a series of tests under carefully controlled conditions indicate the resolution of the system. In a simulated borehole containing alternately water, whose density is 1 gram per cc.; oil, whose density is 0.86 gram per cc.; and air of density 0.0012 gram per cc.; the following results were obtained. Changing the contents of section 12 from oil to water resulted in a 30% change in counting rate. This corresponds to a density change of 0.14 gram per cc. In changing from water to air, a 1000% change in counting rate was experienced. By thus calibrating the system with fluids of different densities, the character of the fluids at any point in the well bore may accurately be determined.

While the foregoing specifications have been set out for the purpose of the present description, it is understood that modifications may now be made by those skilled in the art all within the scope of the appended claims.

What is claimed is:

1. Apparatus for determining the density of fluid including an elongated hollow flow channel adapted to be supported for movement through a conduit carrying such fluid and adapted to direct said fluid therethrough upon movement through said conduit, a source of gamma radiation, mounting means for supporting said source within and adjacent to one end of said flow channel and adapted highly to attenuate gamma radiation in all directions except along a path parallel to the axis of the flow channel to prevent reaction with substances in and adjacent the walls of said conduit, means including an energy sensitive gamma-ray detector supported in said path at a point spaced lengthwise along said channel from said source to detect gamma radiation passing through said fluid intermediate said source and said detector, and means for measuring the detected gamma radiation.

2. Apparatus for determining density of fluid including an elongated hollow flow channel adapted to be supported for movement through a conduit carrying such fluid and adapted to direct said fluid therethrough upon movement through said conduit, a source of gamma radiation mounted in said channel, means adapted highly to attenuate gamma radiation in all directions except along a path parallel to the axis of the flow channel to prevent reaction with substances in and adjacent the walls of said conduit, means including a gamma-ray detector supported in said path and spaced along said channel from said source, and a high density gamma-ray absorbing sheath encompassing said path in the interval between said source and said detector.

3. Apparatus for determining the density of fluids in a well bore which comprises an elongated hollow tube open at the ends thereof, a source of gamma-rays, means adapted to be inserted into one end of said tube for supporting said source substantially at the axis thereof and adapted highly to attenuate gamma radiation except in the direction of the other end of said tube, means including an energy sensitive gamma-ray detector mounted substantially at the axis of and at the other end of said tube, and gamma-ray absorbing means encompassing the path of said gamma-rays between said source and the detecting means.

4. A system for determining the density of fluids in a borehole which comprises an elongated open ended flow channel, a source of gamma radiation mounted adjacent the inlet end of said flow channel, liner means for said flow channel highly to attenuate gamma radiation from said source in all directions except along a path parallel to the axis of said flow channel, a gamma radiation detector positioned in said path at a point spaced from said source to detect gamma radiation passing through fluids within said liner means intermediate said source and said detector, means for supporting said detector substantially at the axis of said channel and in said path and adapted to be coupled to said flow channel for maintaining fixed the spacing between said source and said detector, and means for measuring the detected gamma radiation.

5. A system for measuring density of fluids in a borehole which comprises an elongated borehole tool including an upper section and a lower section, said lower section comprising an elongated hollow tube and said upper section comprising a tubular instrument housing of diameter corresponding to said lower section, a source of gamma radiation positioned adjacent the lower end of said lower section, vane structure secured adjacent said lower end adapted to support said source and to permit flow of fluids past said source through said lower section, a radiation barrier for said lower section to confine gamma radiation substantially to a path parallel to the axis thereof and inside said lower section, an energy sensitive detector of gamma radiation, means for mounting said detector in said upper section adjacent said lower section, coupling means between said upper section and said lower section including web structures for providing flow paths from the upper end of said lower section, high density shielding means encompassing said detector and having an opening in the portion thereof facing said source, cable means for supporting said tool for movement through said borehole and for transmitting signals from said detector, and means coupled to said cable means for measuring said signals in dependence upon the depth of said tool.

6. Apparatus for determining the density of fluid including an elongated hollow flow channel adapted to be supported in a conduit carrying such fluid and adapted to direct fluid therethrough upon relative movement between said flow channel and said fluid, a source of gamma radiation, mounting means for supporting said source within and adjacent to one end of said flow channel and adapted highly to attenuate gamma radiation in all directions except along a path parallel to the axis of said flow channel to prevent reaction with substances in and adjacent to the walls of said conduit, means including an energy sensitive gamma-ray detector supported in said path at a point spaced lengthwise along said channel from said source to detect gamma radiation passing through said fluid intermediate said source and said detector, and means for measuring the detected gamma radiation.

7. Apparatus for determining the density of fluid including an elongated hollow flow channel adapted to be supported in a conduit carrying such fluid and adapted to direct fluid therethrough upon relative movement between said flow channel and said fluid, a source of gamma radiation, mounting means for supporting said source within and adjacent to one end of said flow channel and adapted to transmit gamma radiation along a path parallel to the axis of said flow channel to react with substances in said flow channel, means including an energy sensitive gamma-ray detector supported in said path at a point spaced lengthwise along said channel from said source to detect gamma radiation passing through said fluid intermediate said source and said detector, and means for measuring the detected gamma radiation.

References Cited in the file of this patent

UNITED STATES PATENTS

| | | |
|---|---|---|
| 1,746,616 | Sounitza | Feb. 11, 1930 |
| 2,591,737 | Souther | Apr. 8, 1952 |
| 2,735,944 | Greer | Feb. 21, 1956 |
| 2,769,918 | Tittle | Nov. 6, 1956 |
| 2,932,740 | Widmyer | Apr. 12, 1960 |
| 2,961,539 | Egan et al. | Nov. 22, 1960 |
| 2,965,753 | Reynolds et al. | Dec. 30, 1960 |

UNITED STATES PATENT OFFICE

CERTIFICATE OF CORRECTION

Patent No. 3,123,709                  March 3, 1964

Richard L. Caldwell et al.

It is hereby certified that error appears in the above numbered patent requiring correction and that the said Letters Patent should read as corrected below.

Column 1, lines 20 and 21, for "subsance" read -- substance --; line 44, after "provides" strike out the comma; column 3, line 23, for "density" read -- intensity --; line 40, for "is" read -- in --; column 6, line 22, for "Dec. 30, 1960" read -- Dec. 20, 1960 --.

Signed and sealed this 20th day of October 1964.

(SEAL)
Attest:

ERNEST W. SWIDER                EDWARD J. BRENNER
Attesting Officer                Commissioner of Patents